United States Patent

Mano et al.

[11] Patent Number: 5,220,314
[45] Date of Patent: Jun. 15, 1993

[54] LIQUID CRYSTAL DISPLAY APPARATUS AND METHOD OF PERFORMING LIQUID CRYSTAL DISPLAY

[75] Inventors: Hiroyuki Mano, Yokohama; Tatsuhiro Inuzuka, Kamakura; Satoshi Konuma, Yokohama; Kazuhiro Fujisawa, Fujisawa, all of Japan

[73] Assignee: Hitachi, Ltd., Tokyo, Japan

[21] Appl. No.: 532,811

[22] Filed: Jun. 4, 1990

[30] Foreign Application Priority Data
Jun. 12, 1989 [JP] Japan .................................. 1-146651

[51] Int. Cl.⁵ ............................................. G09G 3/36
[52] U.S. Cl. ..................................... 340/784; 340/701
[58] Field of Search ............... 340/701, 703, 793, 784; 358/241, 242, 429, 455, 456, 457

[56] References Cited

U.S. PATENT DOCUMENTS 4,823,120 4/1989 Thompson et al. ............ 340/701 X
4,956,638 9/1992 Larky et al. ........................ 340/701

Primary Examiner—Ulysses Weldon
Attorney, Agent, or Firm—Antonelli, Terry, Stout & Kraus

[57] ABSTRACT

A liquid crystal display apparatus in which color display information is converted into information about luminance of liquid crystal display used for driving a liquid crystal so as to provide a liquid crystal display. The apparatus comprises a decider unit for deciding whether the color display information takes a display form pursuant to the dither method, and a converter unit for converting the color display information into liquid crystal luminance display information in accordance with a frame base thin-out method corresponding to the color display information when the decision results indicate that the color display information takes a display form pursuant to the dither method and for converting the color display information in accordance with a dot base thin-out method when the decision results do not indicate the dither method.

8 Claims, 4 Drawing Sheets

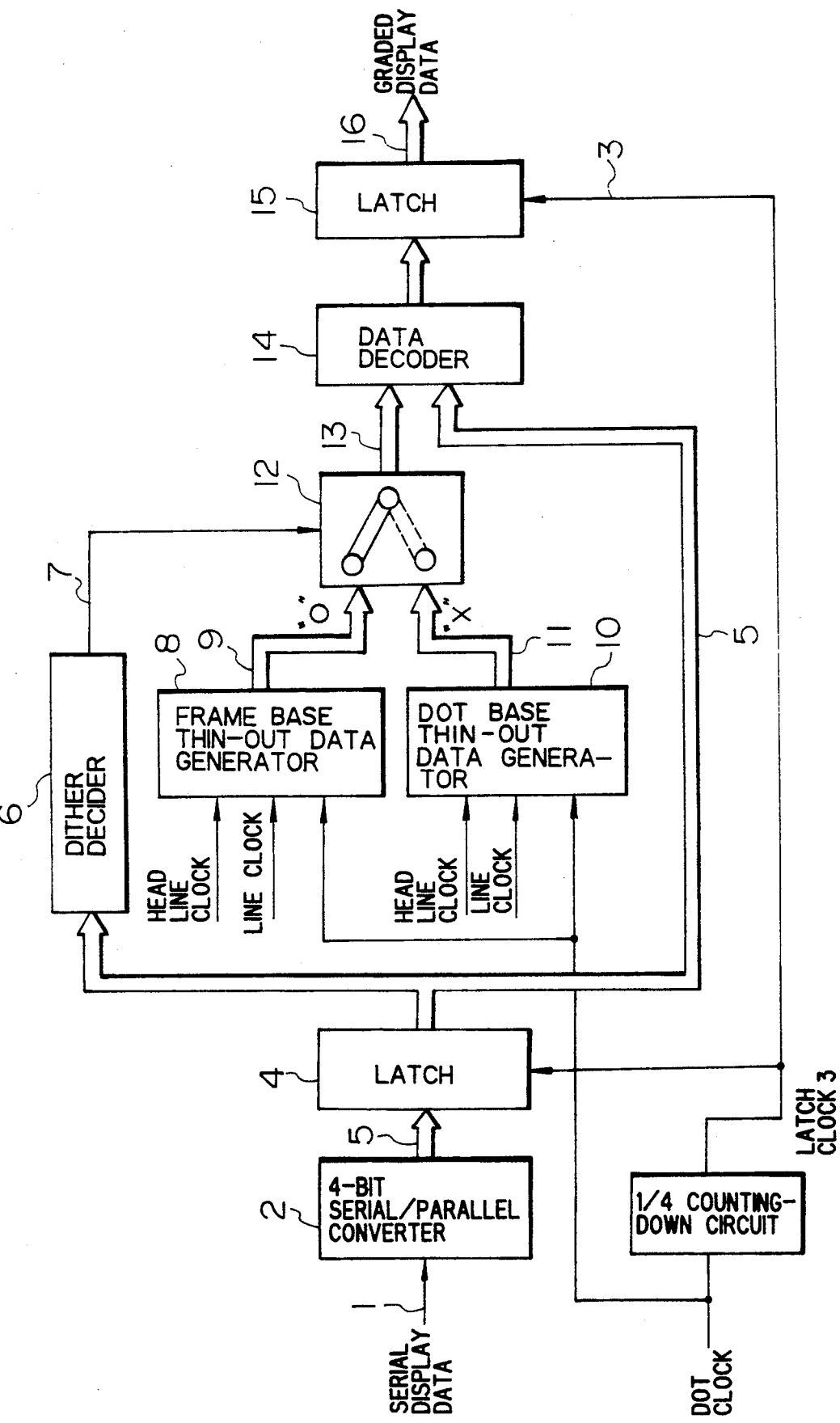

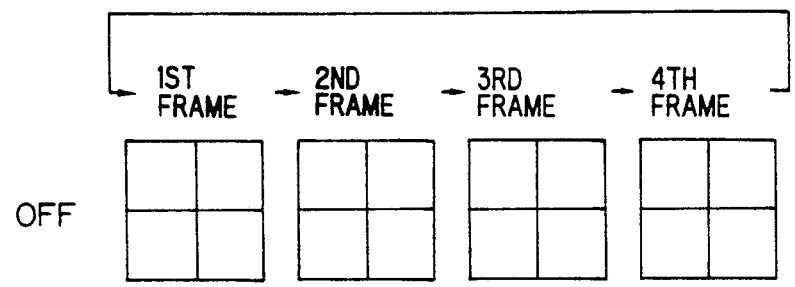
FIG. 2A  OFF
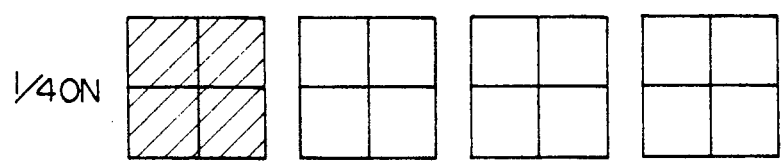
FIG. 2B  1/4 ON
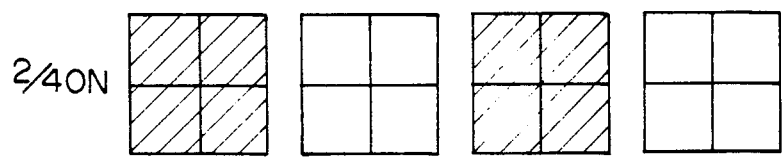
FIG. 2C  2/4 ON
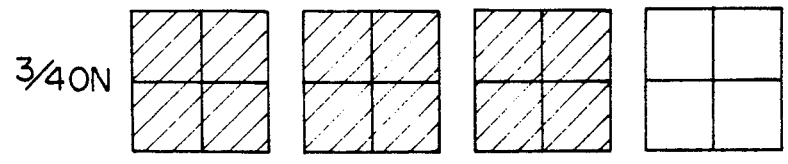
FIG. 2D  3/4 ON
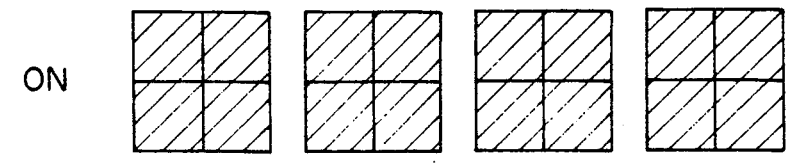
FIG. 2E  ON

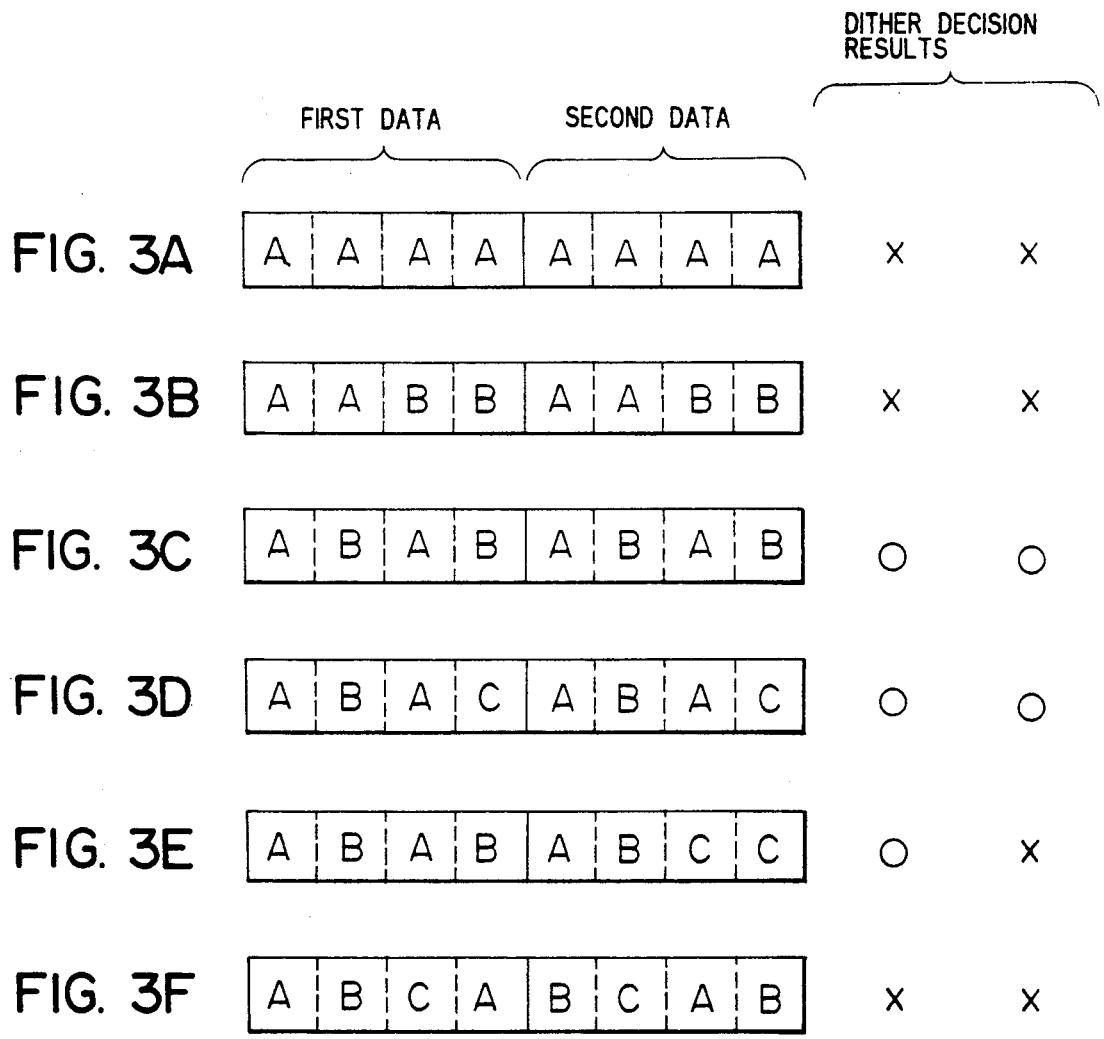

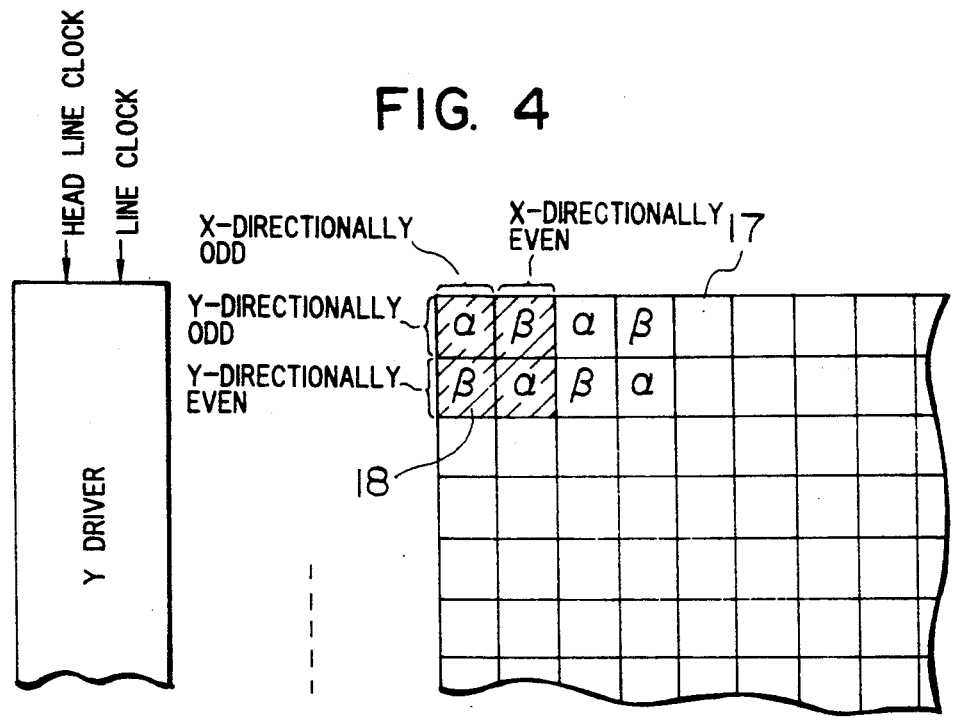

LIQUID CRYSTAL DISPLAY APPARATUS AND METHOD OF PERFORMING LIQUID CRYSTAL DISPLAY

BACKGROUND OF THE INVENTION

1. Field of the Invention

This invention relates to a liquid crystal display apparatus in which color display information is converted into information about luminance of liquid crystal display used for driving a liquid crystal so as to provide a liquid crystal display and a method of performing a liquid crystal display, and more particularly to this type of liquid crystal display apparatus and method capable of alleviating flicker in picture and display flow which occur when display data of a display form pursuant to the dither method is displayed in accordance with gradation display of luminance.

The dither method referred to herein signifies a technique of realizing binary display of graded images of various half tones by making use of human visual characteristics, as well known in the art.

2. Description of the Prior Art

A frame base thin-out method has been proposed to achieve gradation display. That is, a liquid crystal is driven in accordance with an effective value of voltage applied to one dot and luminance of display is proportional to the effective value. In the frame base thin-out method, within a predetermined number of frames, some frames are turned on while the remaining frames are turned off and the rate at which the frames are turned on and turned off is call a thin-out rate and the rate is repeated to control the effective value of the applied voltage to the liquid crystal display, thereby performing, for example, half tone display of luminance in proportion to the effective value. However, the frame base thin-out method has a disadvantage that a flicker occurs in the image display each time a "turn on" operation is switched to a "turn off" operation and vice versa. Also, when dots are thinned out at the same timing over the entire screen, a flicker in the image display occurs to degrade the display quality of the image. Therefore, to eliminate the problem of flicker, the dot base thin-out method has been proposed.

With reference to FIGS. 4 and 5A to 5E, the dot base thin-out method will be described in greater detail. FIG. 4 illustrates a fundamental dot set in the dot base and FIGS. 5A to 5E show thin-out operation effected at a period of four frames.

Referring to FIG. 4, in the dot base thin-out operation is carried out in unit of a fundamental dot set 18 of 4 dots consisting of 2 dots in X direction (one odd dot and one even dot) and 2 dots in Y direction (one odd dot and one even dot) on the screen of a liquid crystal panel 17.

Within a frame defined by the fundamental dot set 18, dots are thinned out at different timings for two groups of which one has two staggered dots represented by $\alpha$ and the other has two staggered dots represented by $\beta$. This thin-out operation will be described specifically with reference to FIGS. 5A to 5E. In these Figures, turned-on dots are depicted by hatched dots.

FIG. 5B shows a display mode at a thin-out rate of $\frac{1}{4}$ in which any one of the four dots constituting the fundamental dot set is turned on once over 4 frames. At a first timing for the dots $\alpha$, dots $\alpha 1$ (the dots $\alpha$ particularly indicated for a first frame) are turned on within the first frame and dots $\alpha 2$ to $\alpha 4$ are turned off within the remaining frames. At a second timing for the dots $\beta$, dots $\beta 3$ (the dots $\beta$ particularly indicated for a third frame) are turned on within the third frame and the dots $\beta 1$, $\beta 2$, $\beta 4$ are turned off within the remaining frames. FIGS. 5C and 5D illustrates similar thin-out modes.

More specifically, in FIG. 5C, at the first timing for the dots $\alpha$, the dots $\alpha 1$ within the first frame and the dots $\alpha 2$ within the second frame are turned on with the dots $\alpha 3$ and $\alpha 4$ within the remaining frames turned off, and at the second timing for the dots $\beta$, the dots $\beta 3$ within the third frame and the dots $\beta 4$ within the fourth frame are turned on with the dots $\beta 1$ and $\beta 2$ within the remaining frames turned off.

In FIG. 5D, at the first timing for the dots $\alpha$, the dots $\alpha 1$ within the first frame, the dots $\alpha 2$ within the second frame and the dots $\alpha 4$ within the fourth frame are turned on with the dots $\alpha 3$ within the remaining frame turned off and at the second timing for the dots $\beta$, the dots $\beta 2$ within the second frame, the dots $\beta 3$ within the third frame and the dots $\beta 4$ within the fourth frame are turned on with the dots $\beta 1$ within the remaining frame turned off. FIGS. 5A and 5E illustrate perfect turn-off display and perfect turn-on display, respectively.

A prior art employing the dot base thin-out method described as above does not take the aforementioned dither technique and conventionally, when the dither method and the dot base thin-out method are used in combination, there arises a problem that the display flow is increased and the picture quality degradation is aggravated.

SUMMARY OF THE INVENTION

The present invention contemplates elimination of the above conventional drawbacks and has for its object to provide a liquid crystal display apparatus and method capable of suppressing the display flow and preventing the picture quality degradation from occurring even when displaying data pursuant to the dither method.

According to the invention, a decision is made as to whether color display information is to take a display form pursuant to the dither method, and when the decision results are positive and indicate that the color display information takes the display form pursuant to the dither method, the color display information is converted into liquid crystal luminance display information in accordance with a frame unit thin-out method corresponding to the color display information when the decision results are negative, the color display information is converted into liquid crystal luminance display information in accordance with a dot base thin-out method.

The present invention having the above construction can ensure exellent liquid crystal display without inviting the picture quality degradation.

BRIEF DESCRIPTION OF THE DRAWINGS

FIG. 1 is a block diagram showing the essential part of an embodiment of the invention;

FIGS. 2A to 2E are diagrams useful to explain thin-out operation in unit of frame;

FIGS. 3A to 3F are diagrams useful to explain the principle of dither decision together with an example of decision results;

FIG. 4 is a diagram useful to explain a fundamental dot set in the dot base thin-out method; and FIGS. 5A to 5E are diagrams useful to explain dot base thin-out operation at a period of 4 frames.

DESCRIPTION OF THE PREFERRED EMBODIMENTS

The present inventors have confirmed that in display based on the dot base frame thin-out method, display flow (which gives a visual feeling that the image runs in the right or left direction) is slightly generated in a display in all-over painting fashion of uniform luminance (at a uniform thin-out rate) but therein, such a flicker as generated in the frame base thin-out method by which thin-out operation is effected at the same timing over the entire screen is not found and the display can be stable.

In the dither method, adjacent two dot sets on the screen are thinned out at different thin-out rates. In this manner, the number of expressible kinds of color can be increased. Thus, by changing the thin-out rate between adjacent two dot sets such that the thin-out rate for the first dot set corresponds to red color and the thin-out rate for the second dot set corresponds to white color, a thin-out rate can be realized which corresponds to pink visually.

However, the present inventors have found that when display data of a display form pursuant to the the dither method undergoes the dot base frame thin-out operation, the aforementioned display flow is aggravated and the picture display becomes unstable, thus aggravating the picture quality degradation.

Referring to FIG. 1, reference numeral 1 designates serial input display data to be subjected to gradation display, 2 a serial/parallel converter adapted to convert the input serial display data into 4-bit parallel data and deliver the parallel data as designated at 5, 4 a latch circuit, 10 a dot base thin-out data generator for generating data 11 pursuant to the aforementioned dot base thin-out method, and 8 a frame base thin-out data generator for generating frame base thin-out data 9. The frame unit thin-out data generator 8 and dot base thin-out data generator 10 are responsive to a head line clock signal and a line clock signal (see FIG. 4) which constitute a liquid crystal panel display drive signal and the serial input display data 1 (color display information) to generate thin-out data corresponding to the input display data as shown in FIGS. 2A to 2E and FIGS. 5A to 5E. For example, in the case of 8-gradation display, each of the generators generates 8 kinds of thin-out data. This operation is in general well known and will not be detailed herein. Reference numeral 6 designates a dither decider for deciding whether the 4-bit parallel data 5 is dither display data and generating, in accordance with the decision results, a select signal 7 which controls a thin-out data selector 12.

The selector 12 is responsive to the select signal 7 to select the thin-out data so that either one of the frame unit thin-out data 9 and dot base thin-out data 11 is selected and delivered as selected thin-out data 13. A data decoder 14 responds to the 4-bit parallel data 5 to decode the selected thin-out data 13 and decoded data is delivered as 4-bit gradation display data 16 through a latch 15. More particularly, the data decoder 14 selects one kind of data from, for example, 8 kinds of selected thin-out data in accordance with the 4-bit parallel data. In other words, one kind of thin-out data is selected from various kinds of thin-out data generated from the data generators 8 and 10 under the direction of the color display information and delivered to the liquid crystal panel. The latches 4 and 15 operate in synchronism with a latch clock signal 3.

It will be appreciated that the X driver for driving the liquid crystal panel in X-axis direction typically fetches display data for determination of turn-on/off of display 4 bits by 4 bits or 8 bits by 8 bits simultaneously. Therefore, by performing decision as to whether the display form is pursuant to the dither method, that is, dither decision in unit of 4 bits, the decision results can be applied to either one of the 4-bit type and 8-bit type X drivers and the display mode can be switched to one commensurate with the X driver in use.

In order to perform control operation in unit of 4 bits, ordinary serial data must be converted into 4-bit parallel data. During an interval of time beginning with conversion of initial serial data of 4 dots into 4-bit parallel data and ending with completion of serial/parallel conversion of the following 4-dot display data, dither decision is carried out for the initial 4 dots, thin-out display data for a display of 4 dots is selected in accordance with the decision results and the selected data is delivered as 4-bit display data to the X driver, thereby preventing the X driver from operating erroneously.

Since the liquid crystal is activated to provide a display of luminance proportional to the effective value of applied voltage, displays of identical luminance can be obtained in different thin-out modes as far as the effective values of applied voltage are identical in these modes and therefore no problem is encountered in display luminance.

The dot base thin-out data generator 10 and frame base thin-out data generator 8 shown in FIG. 1 will now be described.

The dot base thin-out method has already been described by referring to FIG. 4 and FIGS. 5A to 5E but reference should again be made to FIGS. 4 and 5A to 5E in explaining the dot base thin-out data generator 10.

As has been described, FIG. 4 shows the fundamental dot set in the dot base and FIGS. 5A to 5E show thin-out operation effected at a period of four frames.

As will be seen from FIG. 4, the fundamental dot set 18 is constructed of 4 dots of which two are in X-axis direction and two are in Y-axis direction on the liquid display panel 17 and provides dot base thin-out data. The dot base thin-out data generator 10 generates display data 11 for each frame of the fundamental dot set 18 at two different timings, one for the dots $\alpha$ and the other for the dots $\beta$, as shown in FIGS. 5A to 5E.

On the other hand, the frame base thin-out data generator 8 generates display data 9 for each frame by thinning out all dots of the fundamental dot set 18 at the same timing as shown in FIGS. 2A to 2E.

The dot base thin-out data and frame base thin-out data will now be described with reference to FIGS. 5A to 5E and FIGS. 2A to 2E, respectively. In these Figures, hatched dots indicate turned-on dots.

Referring in particular to FIG. 5B, within the first frame, an X-directionally odd and Y-directionally odd dot and an X-directionally even and Y-directionally even dot are turned on at the timing for the dots $\alpha$ and an X-directionally even and Y-directionally odd dot and an X-directionally odd and Y-directionally even dot are turned off at the timing for the dots $\beta$, within the second frame all the dots are turned off, within the third frame the state within the first frame is inverted, and within the fourth frame all the dots are turned off as within the second frame. In connection with each one dot of the fundamental dot set 18, it is turned on once and turned off three times throughout the four frames.

In other words, ¼ turn-on is achieved in a display in unit of four frames.

In the case of the dot base thin-out method shown in FIGS. 5A to 5E, flicker can be eliminated almost completely but display flow in the right or left direction is slightly generated in a display in all-over painting fashion at a uniform thin-out rate, as described previously. When the dot base type is applied to display data pursuant to the dither method, the display flow is aggravated.

Referring now to FIG. 2B, in this example of frame base thin-out data, all dots of the fundamental dot set 18 are thinned out at the same timing so that within the first frame, all the dots are turned on and within the second to fourth frames, all the dots are turned off, indicating that in conneciton with each one dot of the fundamental dot set, it is turned on once throughout the four frames.

In the case of the frame unit thin-out operation as shown in FIGS. 2A to 2E, flicker is large but no display flow is caused in a display in all-over painting fashion. When the frame base type is applied to display data pursuant to the dither method, the flicker can be suppressed and no display flow is found.

As will be seen from the foregoing, evaluation of display quality of the all-over painting like display obtained in accordance with the two kinds of thin-out method and display quality of the dither display indicates that gradation display of higher quality can be realized by using the frame base thin-out method in combination with data of dither display form and the dot base thin-out method in combination with data of another display form.

The dither decider shown in FIG. 1 will now be described with reference to FIG. 3.

The dither decider 6 decides whether the 4-bit parallel data 5 is of dither display form and produces the decision results, an example of which is shown in FIGS. 3A to 3F. In these FIGS., A, B and C represent different pieces of data and the dither display form is settled when the following conditions are satisfied:

(1) Lefthand and righthand dot data pieces about a central dot data piece, which stands for second or third one of the four dot data pieces, differ from the central data piece.

(2) The lefthand and righthand data pieces are identical to each other.

In FIG. 3, "○" in the decision results denotes coincidence with the dither display and "X" denotes non-coincidence with the dither display. First data and second data in FIGS. 3A and 3B do not satisfy condition (1) and "X" results. In FIG. 3C, conditions (1) and (2) are satisfied and "○" results. In FIG. 3D, lefthand and righthand dot data pieces about the second dot data piece B are A and the conditions are satisfied. The fourth data piece C has no relation to the conditions. In FIG. 3E, first data satisfies the conditions but second data does not satisfies the condition and there result "○" and "X" in the decision results. In FIG. 3F, condition (2) is not satisfied.

In this manner, display data of 4 dots satisfying the conditions (1) and (2) for the dither display is determined to be of dither display form by means of the dither decider 6 and a select signal 7 for the data selector 12 is produced from the decider 6. In accordance with the select signal 7, either frame base thin-out data 9 or dot base thin-out data 11 is selected and delivered as selected thin-out data 13. In the data decoder 14, the selected thin-out data 13 is decoded under the direction of the 4-bit parallel data to provide gradation display data 16 which is delivered through the latch 15.

Through the method set forth so far, only when display data of four dots takes a dither display form, gradation display can be carried out in accordance with unit frame thin-out data, and for data of another display form, gradation display can be carried out in accordance with dot base thin-out data.

Returning to FIG. 1, the operation of the circuit will be summarized.

Display data 1 received serially is converted into 4-bit parallel data 5. The 4-bit parallel data is determined to be of a dither display form or not by means of the dither decider 6 and decision results are sent to the data selector 12. The data selector 12 selects either frame unit thin-out data or dot base thin-out data in accordance with the decision results and the data decoder 14 decodes the selected data under the direction of the 4-bit parallel data 5 to produce gradation display data 16 which is delivered to the liquid crystal panel.

It will be appreciated that the dither decision is carried out in unit of 4-bit parallel data and that the dither decider 6 can be constructed of a simple decoder.

In the foregoing, the display data has been described as being limited to a dither display form. More generally, however, decision may be made on a display pattern which would have a trouble with display quality when displayed, such a display pattern being termed A pattern herein. Then, when the A pattern is to be displayed, the pattern display is carried out in accordance with a display method (C method) which does not degrade the display quality but when the display pattern is determined not to be of the A pattern (or determined to be of B pattern), the pattern display is carried out in accordance with a D display method different from the C method.

Thus, in accordance with the present invention, a specified display method is used for a specified display pattern to prevent degradation of the display quality and ensure stable display. The number of the kinds of specified display pattern is not limited to one. Assuming that N kinds of specified display pattern are available, display methods dedicated to the respective kinds may be employed.

According to the present invention, in the liquid crystal display apparatus, when the display pattern is a specified A pattern such as a dither display form, gradation display is carried out in accordance with a specified C method such as the frame unit thin-out method but when the display pattern is a B pattern other than the dither display form, gradation display is carried out in accordance with a D method such as the dot base thin-out method different from the C method, thereby ensuring that any display pattern can be displayed with high display quality.

We claim:

1. A liquid crystal display apparatus in which display information is converted into information about luminance of a liquid crystal display used for driving a liquid crystal so as to provide the liquid crystal display, said apparatus comprising:

decider means responsive to the display information for deciding whether the display information takes a display form pursuant to a dither method and providing an output indicative thereof; and converter means responsive to the output of the decider means for converting the display information into liquid crystal luminance display information in accordance with a frame base thin-out method for a plurality of frames when the output of the decider means is indicative of the dither method and for converting the display information into liquid crystal luminance display information in accordance with a dot base thin-out method when the output of the decider means is not indicative of the dither method.

2. A liquid crystal display apparatus according to claim 1 wherein said converter means includes a data generator unit for generating frame base thin-out data corresponding to said display information and dot base thin-out data, a selector unit for selecting either one of the frame base thin-out data or the dot base thin-out data from said data generator unit in accordance with the decision results, and a decoder unit for decoding selected data.

3. A liquid crystal display apparatus according to claim 1, wherein display information is color display information.

4. A liquid crystal display apparatus comprising:
a signal source for generating a color display information signal;
a frame base thin-out data generator for generating and delivering frame base thin-out data for a plurality of frames;
a dot base thin-out data generator for generating and delivering dot base thin-out data;
a decider unit for deciding whether said color display information signal takes a display form pursuant to a dither method; and
a color display information display form selector unit responsive to a decision output signal from said decider unit, for selecting the frame unit thin-out data when the display form is of the dither method and for selecting the dot base thin-out data when the display form is other than the dither method and for delivering selected data to a liquid crystal display unit.

5. A liquid crystal display apparatus according to claim 4, further comprising a decoder responsive to an output of the selector unit and the display information for supplying display data to the liquid crystal display unit.

6. A liquid crystal display apparatus according to claim 4, wherein said decider unit enables decision in a unit of at least 4 bits of said color display information signal in a horizontal direction of the liquid crystal display unit.

7. A liquid crystal display apparatus according to claim 4, wherein said information display form selector unit includes a selector for selecting the frame base thin-out data or the dot base thin-out data in response to said decision output signal, and a decoder for decoding the thin-out data selected by the selector in response to said color display information signal.

8. A method of performing liquid crystal display in which color display information is converted into information about luminance of liquid crystal display used for driving liquid crystal so as to provide a liquid crystal display on a liquid crystal display panel, said method comprising the steps of:
deciding whether the color display information takes a display form pursuant to a dither method; and
converting said color display information into liquid crystal luminance display information in accordance with a frame base thin-out method for a plurality of frames corresponding to said color display information so as to provide a display when the decision results indicate that the display form is of the dither method, and in accordance with a dot base thin-out method when the decision results indicate that the display form is other than the dither method so as to provide the display.

* * * * *

UNITED STATES PATENT AND TRADEMARK OFFICE
CERTIFICATE OF CORRECTION

PATENT NO.  :   5,220,314
DATED       :   June 15, 1993
INVENTOR(S) :   MANO, et al It is certified that error appears in the above-identified patent and that said Letters Patent is hereby corrected as shown below:

ON THE TITLE PAGE

[73] Hitachi, Ltd., Tokyo, Japan and Hitachi Video
     Engineering, Incorporated, Kanagawa-ken, Japan Signed and Sealed this Twentieth Day of December, 1994

Attest:

BRUCE LEHMAN

*Attesting Officer*   *Commissioner of Patents and Trademarks*